US011901828B2

(12) United States Patent
Chen et al.

(10) Patent No.: US 11,901,828 B2
(45) Date of Patent: Feb. 13, 2024

(54) BIDIRECTIONAL CLLC RESONANT CIRCUIT WITH COUPLED INDUCTOR

(71) Applicant: Zhejiang University, Zhejiang (CN)

(72) Inventors: Min Chen, Zhejiang (CN); Ning Chen, Zhejiang (CN); Bodong Li, Zhejiang (CN); Dongbo Zhang, Zhejiang (CN); Xiaoqing Wang, Zhejiang (CN); Xinnan Sun, Zhejiang (CN); Zhaopei Liang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/673,768

(22) Filed: Feb. 16, 2022

(65) Prior Publication Data
US 2023/0261582 A1  Aug. 17, 2023

(51) Int. Cl.
*H02M 3/335* (2006.01)
*H02M 3/00* (2006.01)
*H02M 1/00* (2006.01)

(52) U.S. Cl.
CPC ......... *H02M 3/33584* (2013.01); *H02M 3/01* (2021.05); *H02M 3/33573* (2021.05); *H02M 1/0064* (2021.05)

(58) Field of Classification Search
CPC .............. H02M 3/33584; H02M 3/01; H02M 3/33573; H02M 1/0064; H02M 3/003; Y02B 70/10
See application file for complete search history.

(56) References Cited

U.S. PATENT DOCUMENTS

| 5,166,869 | A  | * | 11/1992 | Hesterman | H02M 3/01 363/24 |
|---|---|---|---|---|---|
| 6,344,979 | B1 | * | 2/2002 | Huang | H02M 3/3382 363/16 |
| 8,363,427 | B2 | * | 1/2013 | Anguelov | H02M 3/3376 363/21.02 |
| 8,502,634 | B2 | * | 8/2013 | Gruber | H01F 27/2804 336/200 |
| 8,811,039 | B2 | * | 8/2014 | The Ngo | H02M 3/33584 363/21.02 |
| 9,356,523 | B2 | * | 5/2016 | Yoshida | H02M 3/33584 |
| 9,515,562 | B2 | * | 12/2016 | Dai | H02M 3/01 |
| 9,973,099 | B2 | * | 5/2018 | Ye | H02M 3/33576 |
| 9,987,937 | B1 | * | 6/2018 | Mohamed | H02J 50/12 |

(Continued)

*Primary Examiner* — Yusef A Ahmed

(57) ABSTRACT

Related to is a bidirectional CLLC circuit with a coupled inductor, which is associated with a circuit topology and operation control of a bidirectional CLLC resonant converter. Provided is a structure of a bidirectional CLLC resonant circuit with a coupled inductor, including a primary side bridge, a secondary side bridge, a primary side resonant capacitor, a secondary side resonant capacitor, a coupled resonant inductor, and a transformer. Compared with a structure of a conventional bidirectional CLLC resonant circuit, two separate resonant inductors located at a primary side and a secondary side in an original resonant cavity are replaced with one coupled resonant inductor in the circuit; the coupled resonant inductor has opposite dotted terminals with the transformer, and a primary side and a secondary side of the coupled resonant inductor are respectively in serial connection with a primary side and a secondary side of the transformer.

3 Claims, 2 Drawing Sheets

(56) References Cited

U.S. PATENT DOCUMENTS

| | | | |
|---|---|---|---|
| 10,135,350 B2* | 11/2018 | Ye | H02M 3/33576 |
| 10,587,201 B1* | 3/2020 | Chen | H02M 3/33584 |
| 11,088,625 B1* | 8/2021 | Cao | H02M 3/33584 |
| 2008/0224809 A1* | 9/2008 | Zhang | H01F 3/12 |
| | | | 336/170 |
| 2009/0303753 A1* | 12/2009 | Fu | H02M 3/01 |
| | | | 363/20 |
| 2011/0103098 A1* | 5/2011 | Wu | H02M 1/36 |
| | | | 363/17 |
| 2011/0254379 A1* | 10/2011 | Madawala | H02J 7/00712 |
| | | | 307/104 |
| 2013/0265804 A1* | 10/2013 | Fu | H02M 3/33576 |
| | | | 363/17 |
| 2014/0254208 A1* | 9/2014 | Dai | H02M 3/33569 |
| | | | 363/21.02 |
| 2014/0268899 A1* | 9/2014 | Hosotani | H02M 3/33571 |
| | | | 363/17 |
| 2015/0124492 A1* | 5/2015 | Fu | H02M 3/33546 |
| | | | 363/21.02 |
| 2015/0131329 A1* | 5/2015 | Chen | H02M 3/3385 |
| | | | 363/17 |
| 2015/0180350 A1* | 6/2015 | Huang | H02M 3/33584 |
| | | | 307/66 |
| 2015/0229200 A1* | 8/2015 | Schwartz | H02M 1/083 |
| | | | 363/21.03 |
| 2015/0263634 A1* | 9/2015 | Fu | H02M 3/33592 |
| | | | 363/21.02 |
| 2015/0333634 A1* | 11/2015 | Yoshida | H02M 3/33584 |
| | | | 363/21.03 |
| 2016/0294296 A1* | 10/2016 | Lee | H02M 1/44 |
| 2016/0294299 A1* | 10/2016 | Fan | H02M 3/33592 |
| 2017/0033693 A1* | 2/2017 | Madawala | H02M 3/337 |
| 2017/0063251 A1* | 3/2017 | Ye | H02M 3/33576 |
| 2017/0222488 A1* | 8/2017 | Madawala | H02M 3/33523 |
| 2017/0317596 A1* | 11/2017 | Ishigaki | H02M 3/285 |
| 2018/0234022 A1* | 8/2018 | Ye | H02M 3/33576 |
| 2018/0248489 A1* | 8/2018 | Wang | H02M 7/217 |
| 2018/0350513 A1* | 12/2018 | Murakami | H01F 37/00 |
| 2018/0366267 A1* | 12/2018 | Raimann | H01F 27/38 |
| 2019/0023134 A1* | 1/2019 | Cha | H02M 3/33515 |
| 2019/0052126 A1* | 2/2019 | Lee | H02M 3/01 |
| 2019/0288607 A1* | 9/2019 | Zong | H02M 3/33584 |
| 2019/0379291 A1* | 12/2019 | Xue | H02M 7/219 |
| 2020/0091828 A1* | 3/2020 | Fang | H02M 3/01 |
| 2020/0211755 A1* | 7/2020 | Liu | H01F 27/24 |
| 2021/0028712 A1* | 1/2021 | Yu | H01F 30/16 |
| 2021/0083589 A1* | 3/2021 | Dong | H01F 3/14 |
| 2021/0083590 A1* | 3/2021 | Lu | H01F 38/08 |
| 2021/0159804 A1* | 5/2021 | Yamada | H02M 3/33573 |
| 2021/0408923 A1* | 12/2021 | Sun | H02M 7/5387 |
| 2022/0029544 A1* | 1/2022 | Van Dijk | H02M 3/33571 |
| 2022/0224236 A1* | 7/2022 | Elshaer | H01F 27/40 |
| 2022/0271655 A1* | 8/2022 | Chou | H02M 3/33571 |
| 2022/0337166 A1* | 10/2022 | Chan | H02M 1/007 |
| 2022/0345046 A1* | 10/2022 | Wang | H02M 3/33584 |
| 2022/0376607 A1* | 11/2022 | Ye | H02M 3/33571 |
| 2022/0416672 A1* | 12/2022 | Zhuang | H02M 1/0009 |

* cited by examiner

BIDIRECTIONAL CLLC RESONANT CIRCUIT WITH COUPLED INDUCTOR

STATEMENT REGARDING PRIOR DISCLOSURES BY AN INVENTOR OR JOINT INVENTOR

This invention was described in a printed publication by inventor on Mar. 1, 2021 entitled "Research on Kev Technologies of CLLC Bidirectional Resonant Converter for V2G Application" on CNKI.NET.

FIELD OF THE INVENTION

The present disclosure relates to a bidirectional CLLC circuit with a coupled inductor, which is associated with a circuit topology and operation control of a bidirectional CLLC resonant converter and belongs to the field of power electronics application.

BACKGROUND OF THE INVENTION

In recent years, there are great demands for energy storage devices due to the rapid development of new energy power generation, distributed power generation, the frequency modulation service of a power grid, and the micro-grid technology. By adding an energy storage device, fluctuation brought to the power grid by feeding large-scale power from energy power generation to the power grid can be effectively suppressed, so as to improve safety, economy, and flexibility of the power system. In the power system, the energy device has dual attributes, i.e., "power source" and "load" and needs to have capacities of absorbing and supplying electrical energy at the same time. Therefore, a converter that connects the energy storage device and the power grid also needs to realize bidirectional flow of energy. At present, topologies of the bidirectional isolated DC/DC converter are mainly divided into two types. i.e., dual active bridge (DAB) converter and CLLC resonant converter. The CLLC resonant converter has properties such as small turn-off current, small working circulation, easy soft-switching realization, and so on, and it can achieve relatively high working efficiency while realizing a high switching frequency, so that the CLLC resonant converter has advantages of both high efficiency and high power density. However, the CLLC converter has three magnetic elements, i.e., two resonant inductors and one transformer, which occupy a relatively large volume. In order to further optimize the power density of the CLLC converter, it is necessary to integrally design the magnetic elements thereof, i.e., the transformer and the resonant inductors.

Separate magnetic elements are usually used for an existing CLLC converter. Three magnetic elements, i.e., a primary side resonant inductor, a secondary side resonant inductor, and a transformer, are used. The number of the magnetic elements is relatively large, which affects the volume and weight of the transformer. The existing magnetic integration technique usually realizes integration of the primary side resonant inductor, the secondary side resonant inductor, and the transformer by increasing the leakage inductance of the transformer and uses the transformer as a resonant inductor. The leakage inductance of the transformer can be increased by reducing a coupling degree of a primary side winding and a secondary side winding, but this method cannot precisely control the inductance amount of the leakage inductance and will increase conduction loss of coils of the transformer. On the other hand, the leakage inductance can also be increased by adjusting a structure of a magnetic core of the transformer so as to provide an additional pathway for leakage flux. This method can precisely control the inductance amount of the leakage inductance so as to realize integration of an inductor and the transformer. However, it is required to perform customized design on a magnetic structure and a dimension of the transformer according to specifically designed inductance values of the magnetic inductor and resonant inductor, and the integration cannot be realized by using a general magnetic core. By changing a turn ratio of the transformer, one of the primary side resonant inductor and the secondary side resonant inductor may be integrated with the transformer, so as to reduce one resonant inductor. However, a ratio of the magnetic inductor to the resonant inductor in this method is dependent on the turn ratio of the transformer, thus flexible selections cannot be made. As can be seen, existing magnetic integration technologies of the CLLC resonant converter all have respective defects, which limits application of the existing magnetic integration technologies in the CLLC converter. Therefore, it is necessary to improve the existing magnetic integration technologies.

SUMMARY OF THE INVENTION

The problem to be solved by the disclosure is to overcome the defects in existing technologies and provide a bidirectional CLLC circuit with a coupled inductor.

In order to solve the problem, the solution of the disclosure is as follows.

A structure of a bidirectional CLLC resonant circuit with a coupled inductor is provided. The structure of the bidirectional CLLC resonant circuit includes a primary side bridge, a secondary side bridge, a primary side resonant capacitor, a secondary side resonant capacitor, a coupled resonant inductor, and a transformer. Compared with a structure of a conventional bidirectional CLLC resonant circuit, two separate resonant inductors located at a primary side and a secondary side in an original resonant cavity are replaced with one coupled resonant inductor in the circuit; the coupled resonant inductor has opposite dotted terminals with the transformer, and a primary side and a secondary side of the coupled resonant inductor are respectively in serial connection with a primary side and a secondary side of the transformer; and by selecting a proper inductance amount of the coupled inductor and a proper inductance amount of a magnetic inductor of the transformer, an equivalent or approximate replacement of a resonant cavity formed by original separate resonant inductors are realized.

In the disclosure, when a turn ratio of the coupled resonant inductor is the same as a turn ratio of the transformer, the inductance amount of the coupled inductor is $L_{rc}=L_{rp}/2$, and the inductance amount of the magnetic inductor of the transformer is $L_{mc}=L_m+L_{rp}/2$. Herein, $L_{rp}$ and $L_m$ respectively indicate a primary side resonant inductor and a magnetic inductor of a transformer in the resonant capacity formed by the separate resonant inductors, so as to realize a complete and equivalent replacement of an original separate resonant cavity.

When there is a deviation between the turn ratio of the coupled inductor and the turn ratio of the transformer, the inductance amount of the coupled inductor is $L_{rc}=r/(1+h)\cdot L_{rp}$, and the inductance amount of the magnetic inductor of the transformer is $L_{mc}=(k\cdot r+rh/(1+h))\cdot L_{rp}$. Herein, k indicates a ratio of an inductance amount of the magnetic inductor $L_m$ and an inductance amount of the primary side resonant inductor $L_{rp}$ in the resonant cavity formed by the separate resonant inductors; h is a ratio of a turn ratio of the primary side and the secondary side of the transformer to a turn ratio of the primary side and the secondary side of the coupled inductor; and r is determined by a degree of the deviation between the turn ratio of the transformer and the turn ratio of the coupled inductor and is calculated with a formula $$r = \frac{2k+h+1+\sqrt{4k^2+(h-1)^2}}{2(k+h+kh)}.$$

In this way, a resonant frequency and a ratio k of the magnetic inductor of the resonant cavity are maintained to be the same as those of the original separate resonant cavity, so as to realize an approximate replacement of the original separate resonant cavity.

In the disclosure, a wound winding or a planar winding is used for primary side coils and secondary side coils of the coupled resonant inductor and primary side coils and secondary side coils of the transformer.

Principles of the Invention are as Follows.

A primary purpose of the disclosure is to provide a bidirectional CLLC circuit with a coupled inductor, which integrates a primary side resonant inductor and a secondary side resonant inductor of the converter and integrates the two resonant inductors into one magnetic core. The coupled inductor and the transformer may equivalently replace an original structure with a single transformer and two inductors, which can reduce a volume and the number of magnetic elements and improve a power density of the transformer.

In the disclosure, the bidirectional CLLC circuit with the coupled inductor is formed by a primary side bridge, a primary side resonant capacitor, a coupled resonant inductor, a transformer, a secondary side resonant capacitor, and a secondary side bridge. Herein, the coupled resonant inductor has opposite dotted terminals with the transformer, and a primary side and a secondary side of the coupled resonant inductor are respectively in serial connection with a primary side and a secondary side of the transformer. The number of turns of coils of the primary side and the number of turns of coils of the secondary side of the coupled resonant inductor are respectively $N_{rp}$ and $N_{rs}$, and a turn ratio is $N_r(N_r=N_{rp}/N_{rs})$. The number of turns of coils of the primary side and the number of turns of coils of the secondary side of the transformer are respectively $N_p$ and $N_s$, and a turn ratio is $N(N=N_p/N_s)$. The turn ratio of the coupled resonant inductor and the turn ratio of the transformer may be the same, and there may also be a deviation therebetween. When $N_r$ and N are the same, by selecting a certain inductance value of the coupled inductor and a certain inductance value of a magnetic inductor of the transformer, circuit properties can be maintained to be consistent before and after coupling. When there is a deviation between $N_r$ and N, by selecting proper inductance values, a resonant frequency of the circuit can be maintained to be constant, and changes of a gain characteristic of the circuit can be controlled to be within an acceptable scope. When the deviation is small, an approximate and equivalent replacement of a resonant cavity formed by original separate inductors can be realized. The bidirectional CLLC circuit with the coupled resonant inductor includes two magnetic elements, i.e., a coupled inductor and a transformer, so that a volume and the number of the magnetic elements are reduced compared with an existing CLLC resonant converter.

An essential difference between the solution of the disclosure and a conventional solution lies in that, by coupling a primary side resonant inductor and a secondary side resonant inductor and selecting a proper inductance value of a coupled inductor and a proper inductance value of a magnetic inductor of a transformer, replacing original separate magnetic elements is realized, and the purpose of integrating the primary side resonant inductor and the secondary side resonant inductor is achieved without performing customized design on a geometric dimension of a magnetic core; and meanwhile the inductance value of the resonant inductor and the inductance value of the magnetic inductor can be selected flexibly.

Compared with existing technologies, the disclosure has the following beneficial effects:
(1) the disclosure integrates two resonant inductors, i.e., a primary side resonant inductor and a secondary side resonant inductor of a resonant cavity, which greatly reduces a volume and the number of magnetic elements in a circuit and optimizes a power density of a CLLC converter; and
(2) the solution of the disclosure is not dependent on a specific geometric shape and a dimension of a magnetic core, requires no customized design on the magnetic core, and can be realized by using a standardized magnetic core.

BRIEF DESCRIPTION OF THE DRAWINGS

Specific embodiments of the disclosure are further described in detail with reference to the accompanying drawings.

In FIG. 1, $V_{in}$ indicates an input voltage; $V_{out}$ indicates an output voltage; $Q_1$ to $Q_4$ indicate a primary side full-bridge; $Q_5$ to $Q_8$ indicate a secondary side full-bridge; $C_{rp}$ and $C_{rs}$ respectively indicate a primary side resonant capacitor and a secondary side resonant capacitor; $L_{rp}$ and $L_{rs}$ respectively indicate a primary side resonant inductor and a secondary side resonant inductor; T indicates a transformer; and $L_m$ is a magnetic inductor of the transformer. There are three magnetic elements, i.e., $L_{rp}$, $L_{rs}$ and the transformer T, in the circuit.

In FIG. 2, $V_{in}$ indicates an input voltage; $V_{out}$ indicates an output voltage; $Q_1$ to $Q_4$ indicate a primary side full-bridge; $Q_5$ to $Q_8$ indicate a secondary side full-bridge; $C_{rp}$ and $C_{rs}$ respectively indicate a primary side resonant capacitor and a secondary side resonant capacitor; $L_{rc}$ indicates a coupled resonant inductor, with a turn ratio of a primary side to a secondary side thereof being $N_r$: 1; T indicates a transformer, with a magnetic inductor thereof being $L_{mc}$, and a turn ratio of a primary side and a secondary side thereof being N:1. There are two magnetic elements, i.e., the coupled inductor and the transformer, in the circuit. Compared with the existing bidirectional CLLC circuit, the number and a volume of the magnetic elements are reduced.

In FIG. 3, two resonant inductors, i.e., the primary side resonant inductor and the secondary side resonant inductor, and the transformer form the two-port network, with $i_p$ and $i_s$ respectively indicating a primary side resonant current and a secondary side resonant current, $v_1$ and $v_2$ indicating a primary side voltage and a secondary side voltage of the two-port network.

In FIG. 4, the coupled resonant inductor and the transformer form the two-port network, with $i_p$ and $i_s$ respectively indicating a primary side resonant current and a secondary side resonant current, $v_1$ and $v_2$ respectively indicating a primary side voltage and a secondary side voltage of the two-port network, $i_r$ indicating a magnetic current of the coupled inductor, $i_m$ indicating a magnetic current of the transformer.

In FIG. 5, all waveforms in the circuit are regarded as approximating a sinusoidal waveform, and all elements are counted in the primary side of the transformer, so as to obtain the fundamental wave equivalent circuit of the CLLC circuit. $\dot{V}_{in}$ and $\dot{V}_{out}$ respectively indicate an input voltage and an output voltage of the fundamental wave equivalent circuit; $L_1$ and $L_2$ respectively indicate a primary side resonant inductor and a secondary side resonant inductor after counting; a ratio of $L_2$ to $L_1$ is marked as h; $C_1$ and $C_2$ respectively indicate a primary side resonant capacitor and a secondary side resonant capacitor after counting; $L_m$ indicates a magnetic inductor of the transformer after counting; and $R_e$ is an equivalent resistor of a load.

DETAILED DESCRIPTION OF THE EMBODIMENTS

The disclosure is further described below with reference to specific embodiments, but the protection scope of the disclosure is not merely limited to this.

Figure 1:
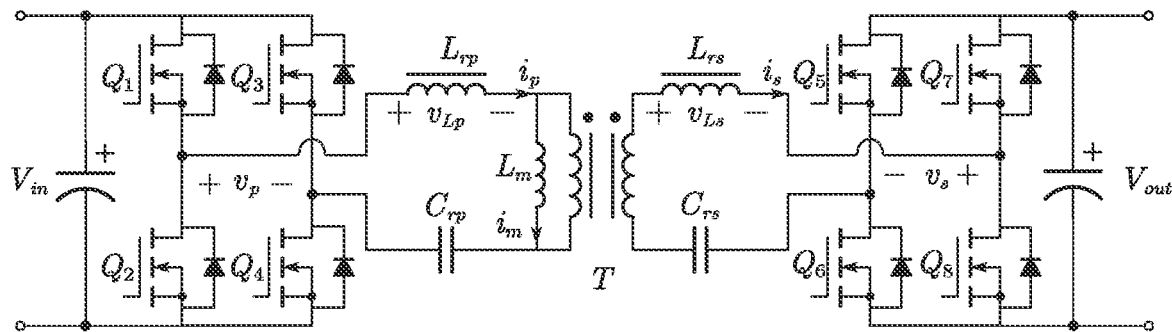
FIG. 1 is a schematic diagram of an existing bidirectional CLLC circuit.
Figure 3:
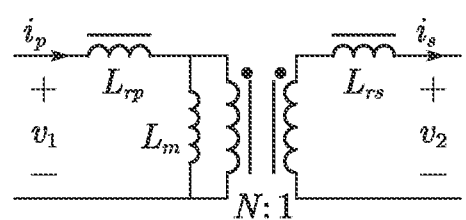
FIG. 3 is a two-port network formed by magnetic elements in the existing bidirectional CLLC circuit.

As shown in FIG. 1, an existing bidirectional CLLC circuit usually has a structure of separate magnetic elements and needs to use three magnetic elements, i.e., a primary side resonant inductor $L_{rp}$, a secondary side resonant inductor $L_{rs}$, and a transformer. The number and a volume of the magnetic elements is large, which reduces a power density of a converter. A two-port network formed by the magnetic elements is as shown in FIG. 3. Herein, $i_p$ and $i_s$ respectively indicate a primary side resonant current and a secondary side resonant current, and $v_1$ and $v_2$ respectively indicate a primary side port voltage and a secondary side port voltage of the two-port network. Further, port properties of the two-port network may be indicated as follows.

$$v_1 = (L_m + L_{rp}) \cdot \frac{di_p}{dt} - \frac{L_m}{N} \cdot \frac{di_s}{dt} \tag{1}$$

$$v_2 = \frac{L_m}{N} \cdot \frac{di_p}{dt} - \left(\frac{L_m}{N^2} + L_{rs}\right) \cdot \frac{di_s}{dt} \tag{2}$$

Figure 2:
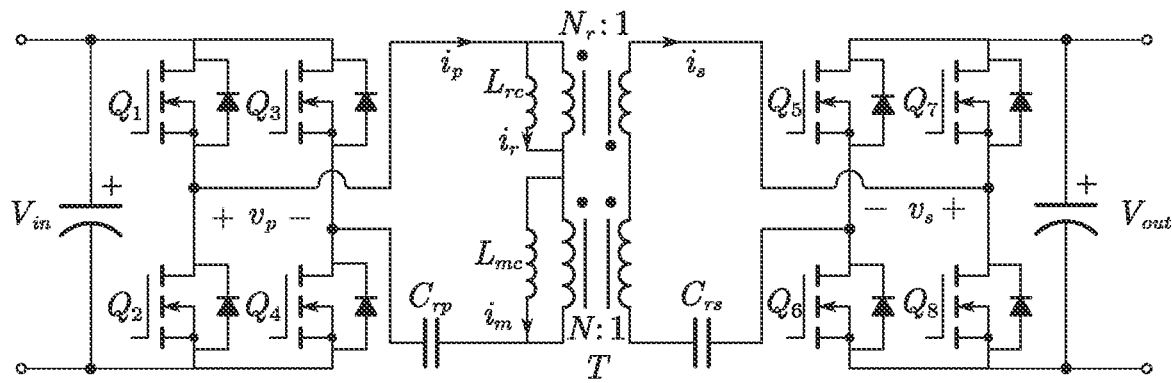
FIG. 2 is a schematic diagram of a bidirectional CLLC circuit with a coupled inductor.
Figure 4:
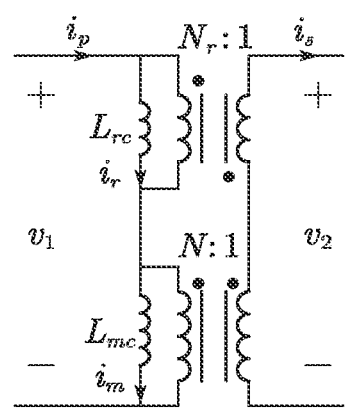
FIG. 4 is a two-port network formed by the coupled inductor and a transformer in the solution of the disclosure.

As long as the port properties are maintained to be consistent, an equivalent replacement of an existing structure of separate magnetic elements can be realized. As shown in FIG. 2, a bidirectional CLLC circuit with a coupled inductor is formed by a coupled resonant inductor, a transformer, a primary side resonant capacitor, a secondary side resonant capacitor, a primary side bridge, and a secondary side bridge. Herein, the coupled resonant inductor is in serial connection to a primary side and a secondary side of the transformer, so as to form a two-port network as shown in FIG. 4. For the two-port network, port properties thereof may be indicated as follows.

$$v_1 = (L_{mc} + L_{rc}) \cdot \frac{di_p}{dt} - \left(\frac{L_{mc}}{N} - \frac{L_{rc}}{N_r}\right) \cdot \frac{di_s}{dt} \tag{3}$$

$$v_2 = \left(\frac{L_{mc}}{N} - \frac{L_{rc}}{N_r}\right) \cdot \frac{di_p}{dt} - \left(\frac{L_{mc}}{N^2} + \frac{L_{rc}}{N_r^2}\right) \cdot \frac{di_s}{dt} \tag{4}$$

In order to realize an equivalent replacement of a resonant cavity formed by original separate magnetic elements, the port properties of the two-port network should be completely the same as the port properties of the structure of the original separate magnetic elements. For a CLLC resonant converter, in order to obtain a gain characteristic that a voltage in a forward direction and a voltage in a reverse direction are consistent, a symmetric resonant cavity structure is usually used. At this time an inductance value of a primary side resonant inductor and an inductance value of a secondary side resonant inductor after elements are counted in the primary side are equal. Therefore, a turn ratio of a primary side to a secondary side of the coupled inductor and a turn ratio of a primary side to a secondary side of the transformer are selected to be consistent, so as to further obtain conditions for realizing an equivalent replacement, i.e., $L_{rc}=L_{rp}/2$ and $L_{mc}=L_m+L_{rp}/2$. Accordingly, the equivalent replacement of a resonant cavity formed by original separate magnetic elements can be realized.

Figure 5:
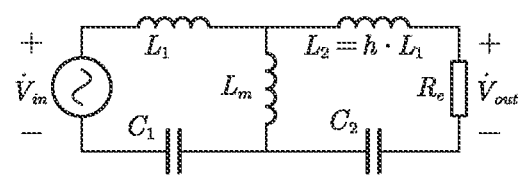
FIG. 5 is a fundamental wave equivalent circuit according to the solution of the disclosure.

For actual application, since the number of turns of coils of the resonant inductor is generally less than the number of turns of coils of the transformer, in order to realize optimized design of the coupled inductor, the turn ratio of the coupled inductor may not be completely consistent with the turn ratio of the transformer. The solution of the disclosure allows a deviation between the turn ratio of the coupled inductor and the turn ratio of the transformer, so as to adapt to a circumstance where the number of turns of coils of the inductor is relatively small. When there is deviation between the turn ratio of the coupled inductor and the turn ratio of the transformer, based on the port properties of the network formed, parameters of a fundamental wave equivalent circuit in FIG. 5 can be obtained as follow.

$$L_m = L_{mc} - h \cdot L_{rc} \tag{5}$$

$$L_1 = (1+h) \cdot L_{rc} \tag{6}$$

$$L_2 = h \cdot (1+h) \cdot L_{rc} \tag{7}$$

Herein, $h=N/N_r$, and indicates a degree of the deviation between the turn ratio of the coupled inductor and the turn ratio of the transformer. Under this circumstance, the primary side resonant inductor and the secondary side resonant inductor of the resonant cavity cannot be maintained to be completely the same, and a ratio of the two is constantly h. With respect to this, the disclosure provides a parameter design method of maintaining a resonant frequency and a ratio of a magnetic inductor and a resonant inductor of the circuit to be constant. According relevant theories of a non-symmetric CLLC circuit, at this time the resonant frequency of the circuit meets $$\omega_r = \sqrt{r/(L_1 C_1)}.$$

Herein, $$r = \frac{2k + h + 1 + \sqrt{4k^2 + (h-1)^2}}{2(k + h + kh)}, \quad (8)$$

in which k is a ratio of an inductance amount of a magnetic inductor $L_m$ and an inductance amount of the primary side resonant inductor $L_{rp}$ in the resonant cavity formed by original separate inductors. The coefficient r is only a constant that is associated with a ratio of the magnetic inductor and the resonant inductor and the degree of the deviation of the turn ratios, and is not associated with a specific inductance amount of the inductor. Therefore, in order to maintain a resonant frequency of the resonant cavity and a resonant frequency of the resonant cavity formed by original separate magnetic elements to be consistent, an inductance value of the coupled inductor should be calculated with the following formula:

$$L_{rc} = \frac{r}{1+h} \cdot L_{rp}. \quad (9)$$

On the other hand, in order to maintain a ratio k of the magnetic inductor and the resonant inductor in the original separate resonant cavity to be consistent, an inductance value of the magnetic inductor of the transformer should be calculated with the following formula:

$$L_{mc} = \left(k \cdot r + \frac{rh}{1+h}\right) \cdot L_{rp} \quad (10)$$

Accordingly, an approximate replacement of original separate magnetic elements can be performed in the circumstance that there is a derivation between the turn ratio of the coupled inductor and the turn ratio of the transformer. When the derivation between the turn ratio of the coupled inductor and the turn ratio of the transformer is relatively small, such a parameter selecting method provided by the disclosure can maintain the resonant frequency of the circuit to be constant and control influence on the gain characteristic of the circuit to be within a relatively small scope.

By coupling the primary side resonant inductor and the secondary side resonant inductor and selecting a proper inductance value of the coupled inductor and a proper inductance value of the magnetic inductor of the transformer, the bidirectional CLLC circuit with a coupled inductor in FIG. 2 can be obtained, so as to achieve the purpose of reducing the number and a volume of magnetic elements.

Finally, it should be further noted that the above examples enumerated are only several specific embodiments. Obviously, the disclosure is not limited to the above embodiments, and there may be various deformations. Deformations that can be derived or conceived of by a person of ordinary skills in the art shall all be regarded as falling within the protection scope of the disclosure.

The invention claimed is:

1. A bidirectional Capacitance-Inductance-Inductance-Capacitance (CLLC) resonant circuit, comprising a primary side bridge, a secondary side bridge, a primary side resonant capacitor, a secondary side resonant capacitor, a coupled resonant inductor, and a transformer;
    wherein the coupled resonant inductor has opposite dotted terminals with the transformer, and a primary side and a secondary side of the coupled resonant inductor are respectively in serial connection with a primary side and a secondary side of the transformer;
    wherein the primary side resonant capacitor is connected in series between a port of the primary side bridge and the primary side of both the coupled resonant inductor and transformer, while the secondary side resonant capacitor is connected in series between a port of the secondary side bridge and the secondary side of both the coupled resonant inductor and transformer; and
    wherein the coupled resonant inductor and the transformer form a two-port network having port properties defined by following formulas:

$$v_1 = (L_{mc} + L_{rc}) \cdot \frac{di_p}{dt} - \left(\frac{L_{mc}}{N} - \frac{L_{rc}}{N_r}\right) \cdot \frac{di_s}{dt} \text{ and}$$

$$v_2 = \left(\frac{L_{mc}}{N} + \frac{L_{rc}}{N_r}\right) \cdot \frac{di_p}{dt} - \left(\frac{L_{mc}}{N^2} + \frac{L_{rc}}{N_r^2}\right) \cdot \frac{di_s}{dt};$$

where $v_1$ and $v_2$ respectively indicate a primary side port voltage and a secondary side port voltage of the two-port network, $i_p$ and $i_s$ respectively indicate a primary side resonant current and a secondary side resonant current, $L_{rc}$ indicates an inductance value of the coupled resonant inductor, a turn ratio of the primary side $N_r$ to the secondary side of the coupled resonant inductor is $N_r$:1; $L_{mc}$ is an inductance value of a magnetic inductor of the transformer, and a turn ratio of the primary side and the secondary side of the transformer is N:1, and N is a ratio of primary side coil turns Np of the transformer to secondary side coil turns Ns of the transformer, where Np and Ns are integers greater than or equal to one.

2. The bidirectional Capacitance-Inductance-Inductance-Capacitance (CLLC) resonant circuit according to claim 1, wherein
    the turn ratio of the coupled resonant inductor is the same as the turn ratio of the transformer.

3. The bidirectional Capacitance-Inductance-Inductance-Capacitance (CLLC) resonant circuit according to claim 1, wherein a wound winding or a planar winding is used for primary side coils and secondary side coils of the coupled resonant inductor and primary side coils and secondary side coils of the transformer.

* * * * *